United States Patent [19]

Karasawa et al.

[11] Patent Number: 5,110,849

[45] Date of Patent: May 5, 1992

[54] POLYESTER COMPOSITION

[75] Inventors: Hiroo Karasawa; Kiichi Kometani; Kiyokazu Nakamura, all of Aichi, Japan

[73] Assignee: Toray Industries, Inc., Japan

[21] Appl. No.: 565,650

[22] Filed: Aug. 10, 1990

[51] Int. Cl.$^5$ ............... C08K 5/3495; C08K 5/3432; C08K 5/32; C08K 5/16; C08K 5/20; C08K 5/13; C08K 5/15; C08K 5/04

[52] U.S. Cl. ................................ 524/87; 524/91; 524/99; 524/111; 524/161; 524/204; 524/208; 524/222; 524/225; 524/260; 524/324; 524/327; 524/329

[58] Field of Search ............... 524/91, 87, 222, 225, 524/204, 208, 260, 324, 327, 329, 161, 91, 111, 99

[56] References Cited

U.S. PATENT DOCUMENTS

| | | | |
|---|---|---|---|
| 3,057,895 | 10/1962 | Johns et al. | 524/204 |
| 3,297,650 | 1/1967 | Halmi et al. | 524/328 |
| 3,413,263 | 11/1968 | Strobel et al. | 524/328 |
| 4,363,892 | 12/1982 | Shain | 524/327 |
| 4,373,953 | 2/1983 | Deinet et al. | 524/327 |
| 4,623,480 | 11/1986 | Gugumus | 524/328 |

FOREIGN PATENT DOCUMENTS 0351732 1/1990 European Pat. Off.

OTHER PUBLICATIONS

The Condensed Chemical Dictionary-10th edition, p. 88 (1981).

Primary Examiner—Veronica P. Hoke
Attorney, Agent, or Firm—Austin R. Miller

[57] ABSTRACT

The present invention concerns a thermoplastic polyester resin composition comprising a thermoplastic polyester and a metal alcoholate salt of an aromatic alcohol containing a hydroxy group directly attached to the aromatic ring as the essential ingredient, having a high crystallization rate, excellent moldability upon molding at low temperature, less molecular weight reduction during production and molding of the resin composition, and satisfactory melt degradation stability and hydrolysis resistance.

8 Claims, No Drawings

POLYESTER COMPOSITION

BACKGROUND OF THE INVENTION (A) Field of the Invention

The present invention concerns a polyester resin composition having a high crystallization rate and excellent moldability upon using molds at low temperature, with less reduction of molecular weight upon preparing and molding the resin composition, and of satisfactory melt degradation stability and hydrolysis resistance.

(B) Description of the Prior Art

Thermoplastic polyesters have excellent mechanical properties, as well as physical and chemical natures and, accordingly, they have been used in wide application use. Among them, several thermoplastic polyesters, for example, polyethylene terephthalate have particularly excellent properties but they have not yet been used so generally at present for injection molding.

This is due to the fact that polyethylene terephthalate, in particular, involves a problem in moldability in that it has a slower crystallization rate as compared with other crystalline polymers and, therefore, is not crystallized sufficiently in a mold at a low temperature from 50° to 95° C. which is usually used for injection molding, and so it cannot give a satisfactory molded product.

In view of the above, with an aim of improving moldability, various studies have been made on additives that can improve the crystallization rate of thermoplastic polyesters. For instance, there have been known those compositions comprising thermoplastic polyesters to which an alkali metal salt of salicylic acid is added as disclosed in Japanese Patent Publication (Kokai) 61-157556, or an alkali metal salt of phenol sulfonic acid as disclosed in Japanese Patent Publication (Kokai) 56-57825.

However, in these conventional compositions described above, the crystallization rate of polyesters can not be improved much, and also the molecular weight of the polyesters is remarkably reduced upon melt molding or during production of resin compositions, and therefore only those molding products having poor mechanical properties are obtained. In addition there has been a problem that hydrolysis resistance of the polyester is deteriorated if an additive having a relatively great improvement of the crystallization rate is added.

SUMMARY OF THE INVENTION

Accordingly, the object of the present invention is to remarkably improve the crystallization rate of a thermoplastic polyester thereby improving its moldability, as well as provide a thermoplastic polyester of satisfactory mechanical properties with less reduction in the molecular weight upon melt molding or during production of the resin composition and less reduction in hydrolysis resistance.

The feature of the present invention for attaining the object is to provide a thermoplastic polyester composition comprising 100 parts by weight of a thermoplastic polyester and, added thereto from 0.005 to 10 parts by weight of a metal salt of a aromatic alcohol having at least one hydroxyl group bonded to the aromatic ring and at least one non-ionic substituent group bonded to the aromatic ring, in which the hydroxyl group is in the form of a metal salt selected from the group consisting of alkali metal, alkaline earth metal, aluminum and zinc.

PREFERRED EMBODIMENT OF THE INVENTION

The thermoplastic polyester used in the present invention is a polymer or copolymer obtained by polycondensation and comprising a dicarboxylic acid (or ester-forming derivative thereof) and a diol (or ester-forming derivative thereof) as the main ingredient.

As the dicarboxylic acid used herein, there can be mentioned aromatic dicarboxylic acids such as terephthalic acid, isophthalic acid, ortho-phthalic acid, 1,5-naphthalene dicarboxylic acid, 2,5-naphthalene dicarboxylic acid, 2,6-naphthalene dicarboxylic acid, 2,7-naphthalene dicarboxylic acid, 2,2'-biphenyl dicarboxylic acid, 3,3'-biphenyl dicarboxylic acid, 4,4'-biphenyldicarboxylic acid, 4,4'-biphenylether dicarboxylic acid, 4,4'-diphenylmethane dicarboxylic acid, 4,4'-diphenylsulfone dicarboxylic acid, 4,4'-diphenyl isopropylidenedicarboxylic acid, 1,2-bis(phenoxy) ethane-4',4'''-dicarboxylic acid, 2,5-anthracene dicarboxylic acid, 2,6-anthracene dicarboxylic acid, 4,4'-p-terphenylene dicarboxylic acid and 2,5-pyridine dicarboxylic acid; aliphatic dicarboxylic acid such as adipic acid, sebacic acid, azelaic acid, dodecanedioic acid and dimer acid; cycloaliphatic carboxylic acid such as 1,4-cyclohexane dicarboxylic acid, 1,3-cyclohexane dicarboxylic acid; or the ester-forming derivatives thereof, terephthalic acid being used preferably in particular. A mixture of two or more of these dicarboxylic acids may also be used.

Further, as the diol ingredient, there can be mentioned aliphatic diol such as ethylene glycol, propylene glycol, butylene glycol, hexylene glycol, neopentyl glycol, 1,5-pentane glycol, decamethylene glycol, 2-methyl-1,3-propane diol, diethylene glycol and triethylene glycol; cycloaliphatic diol such as 1,4-cyclohexane dimethanol and cyclohexane diol, as well as mixtures thereof.

One or more long-chained dials with molecular weight of from 400 to 6,000, e.g., polyethylene glycol, polypropylene glycol or polytetramethylene glycol may be copolymerized if they are used in a small amount.

As examples for specific thermoplastic polyesters, there can be mentioned polyethylene terephthalate, polypropylene terephthalate, polybutylene terephthalate, polyethylene naphthalate, polybutylene naphthalate, polycyclohexane dimethylene terephthalate and polyethylene-1,2-bis(phenoxy) ethane-4',4'''-dicarboxylate, as well as copolyesters such as polyethylene isophthalate/terephthalate, polybutylene terephthalate/isophthalate and polybutylene terephthalate/decane dicarboxylate. Among such thermoplastic polyesters, polybutylene terephthalate, polycyclohexane dimethylene terephthalate, polyethylene naphthalate or polyethylene terephthalate which is well-balanced in mechanical properties, moldability, etc. is preferred.

Preferred thermoplastic polyesters used in the present invention have an intrinsic viscosity from 0.25 to 3.0 dl/g, particularly, 0.4 to 2.25 dl/g as measured in an o-chlorophenol solution at 25° C.

Aromatic the alcohol metal salts of which are crystallization improvers in the present invention, are those compounds having at least one aromatic ring. at least one hydroxyl group directly bonded to the aromatic ring and at least one non-ionic group bonded to the aromatic ring.

As examples of the aromatic ring constituting the main skelton, there may be used, for example, aromatic hydrocarbon such as benzene, naphthalene, phenanthrene, anthracene and pyrene; heterocyclic aromatic rings such as pyridine, triazine, furan, quinoline, isoquinoline or 1,10-phenanthrene, as well as those condensed ring systems containing an aromatic ring such as indene, indole, benzofuran, fluorene or dibenzofuran.

It is necessary that the aromatic ring constituting the main skelton contains at least one hydroxyl group and at least one non-ionic group directly bonded thereto. These substituent groups including the hydroxyl group may be bonded by any number and bonded at any position of the aromatic ring.

The expression "non-ionic group" means herein those groups not having definite ion bondings as in carboxylate salt, sulfonate salt, phosphate salt, ammonium salt, diazonium salt or thiocarboxylate salt.

As examples of the non-ionic groups, there can be mentioned the following groups (i)–(iv):
(i) cyano group, nitro group, formyl group,
(ii) acyl group, sulfonyl group,
(iii) alkoxycarbonyl group, carboamide group, hydrocarbon group,
(iv) triazole group, oxazole group, thiazole group, As specific examples of the acyl groups in (ii) above, there can be mentioned acetyl, propionyl, benzoyl, naphthoyl and toluoyl and, among them, aliphatic acyl group or aromatic acyl group with a molecular weight not greater than 170 are preferred, acetyl or benzoyl being particularly preferred.

As specific examples for the sulfonyl group in (ii) above, there can be mentioned methyl sulfonyl, ethyl sulfonyl, phenyl sulfonyl, toluyl sulfonyl or chlorophenyl sulfonyl. Substituted or not-substituted aromatic sulfonyl group is preferred, phenyl sulfonyl being most preferred.

As specific examples for the alkoxycarbonyl group, carboamide group and hydrocarbon group in (iii) above, there can be mentioned carbomethoxy, carboethoxy, carbophenoxy, carbo-t-butoxy, N,N-dimethylcarboamide, N-phenylcarboamide, N-t-butylcarboamide, N-cyclohexyl-carboamide, methyl, t-butyl, hexyl, cyclohexyl, phenyl, naphthyl and 2-(4'-isopropoxyphenyl)-2-propyl. Among them, groups having secondary or tertiary or ring structure such as carbo-t-butoxy, N-phenylcarboamide, N-t-butylcarboamide, N-cyclohexylcarboamide, t-butyl, cyclohexyl, phenyl, naphthyl, 2-(4'-isopropoxyphenyl)-2-propyl are particularly preferred.

As specific examples of the triazole group in (iv) above, there can be mentioned benzotriazoyl, naphthotriazoyl, etc., particularly substituted or not-substituted benzotriazoyl is preferred. As specific examples of oxazoyl, there can be mentioned 2-oxazoyl, 4-oxazoyl and 5-oxazoyl, particularly 2-oxazoyl is preferred. As specific examples of thiazoyl, there can be mentioned 2-thiazoyl, 4-thiazoyl and 5-thiazoyl, particularly 2-thiazoyl is preferred.

Among the non-ionic groyps (i)–(iv) described above, particularly preferred are substituent groups contained in (i), acyl group in (ii), alkoxycarbonyl group and carboamide group in (iii) and triazole group in (iv).

These non-ionic groups may be bonded at any chemically possible position on the aromatic ring of the skelton. For instance, in the case of 5-phenyl-2-naphthol, there can be mentioned the 1, 3, 4, 6, 7, 8, 2', 3' and 4'-positions. However, among various positions of bonding, it is preferred that the non-ionic group is directly bonded to the same ring to which the hydroxyl group is bonded. That is, in the case of 5-phenyl-2-naphthol, there can be mentioned, for example, the 1, 3, 4, 6, 7, 8-positions. Further, it is most preferred that the non-ionic group is bonded at the position adjacent to the hydroxyl group. In this case, the position adjacent to the hydroxyl group means the bonding positions of carbon atoms bonded to a carbon atom to which the hydroxyl group is bonded and, for example, the 1,3-positions are most preferred in the case of 5-phenyl-2-naphthol.

As specific examples of substituted aromatic alcohols there can be mentioned methylphenol, butylphenol, phenylphenol, cyanophenol, formylphenol, acetylphenol, benzoylphenol, hexanoylphenol, nitrophenol, cyanonaphthol, formylnaphthol, nitronaphthol, acetylnaphthol, nitrosonaphthol, acetylnaphthol, phenyl-4-hydroxyphenyl ketone, phenyl-2-hydroxyphenyl ketone, phenyl-4-hydroxyphenyl sulfone, phenyl-2-hydroxyphenyl sulfone, 3,3-bis(4-hydroxyphenyl) propane, bis(4-hydroxy-phenyl) methane, bis(4-hydroxyphenyl) sulfone, bis(2-hydroxyphenyl) sulfone, bis(4-hydroxyphenyl) ketone, bis(2-hydroxyphenyl) ketone, bis(2-hydroxy-4-methoxyphenyl) ketone, bis(4-hydroxyphenyl) sulfide, 2-carbomethoxyphenol, 2-carboethoxyphenol, 4-carboethoxyphenol, 2-carbopropoxyphenol, 4-carbopropoxyphenol, 2-carbobutoxyphenol, 4-carbobutoxyphenol, N-phenylcarboamide phenol and phenol containing benzotriazole as shown in the general formulae (1)–(11).

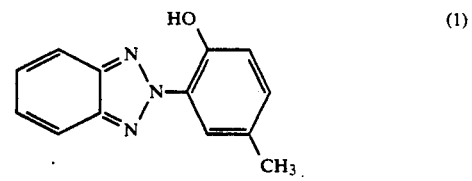

(1)

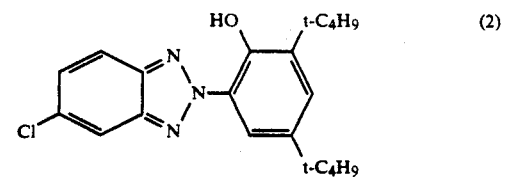

(2)

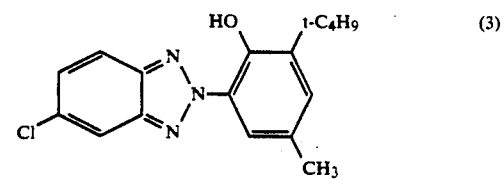

(3)

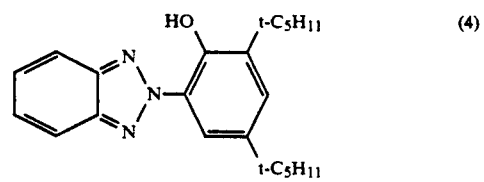

(4)

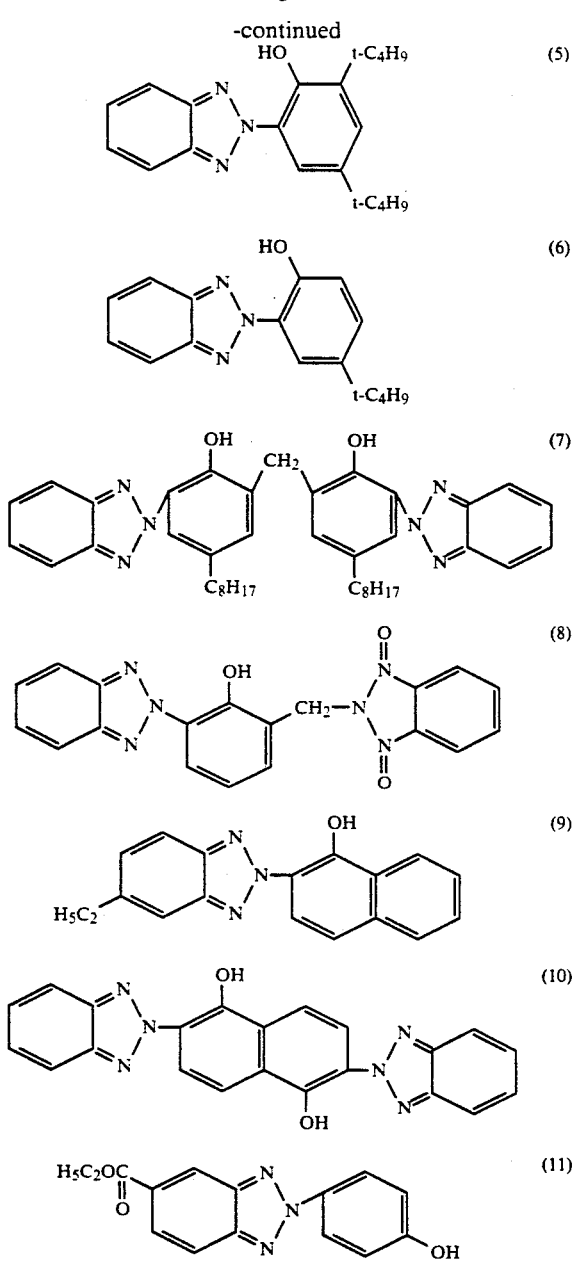

Among them, those preferred are 2-t-butylphenol, 2-phenylphenol, 2-cyanophenol, 4-cyanophenol, 2-nitrophenol, 4-nitrophenol, 1-cyano-2-naphthol, 3-cyano-2-naphthol, 2-cyano-1-naphthol, 1-nitro-2-naphthol, 2-nitro-1-naphthol, 2-formylphenol, 2-acetylphenol, 1-formyl-2-naphthol, 2-formyl-1-naphthol, 1-acetyl-2-naphthol, 2-acetyl-1-naphthol, phenyl-4-hydroxyphenyl sulfone, phenyl-2-hydroxyphenyl sulfone, phenyl-4-hydroxyphenyl ketone, phenyl-2-hydroxyphenyl ketone, bis(2-hydroxyphenyl) ketone, bis(2-hydroxy-4-methoxyphenyl) ketone, 4-carboethoxyphenol, 4-carbropopoxyphenol, 4-carbobutoxyphenol, N-phenylcarbo-amidephenol and phenols containing benzotriazole group as shown in the general formulae (1)-(8). Among them, 2-cyanophenol, 2-nitrophenol, 1-nitro-2-naphthol, 2-nitro-1-naphthol, 2-formylphenol, 2-acetylphenol, 1-formyl-2-naphthol, 2-formyl-1-naphthol, bis(2-hydroxy-4-methoxyphenyl) ketone, 4-carbopropoxyphenol, N-phenylcarboamide phenol and phenols containing benzotriazole group represented by the general formula (1)-(6) can be mentioned as particularly preferred examples.

There is no particular restriction on metal salts of substituted aromatic alcohols used in the present invention, so long as the hydrogen atoms of hydroxyl groups of the substituted aromatic alcohols are substituted by metal atoms. As metals, there can be mentioned, for example, alkali metals such as lithium, sodium and potassium, alkaline earth metals such as beryllium, magnesium, calcium, strontium and barium, as well as metals such as aluminium and transition metals such as iron. Among them, alkali metal and alkaline earth metal are used preferably and an alkali metal, in particular, sodium is most preferred.

The addition amount of the metal salt of the substituted aromatic alcohol in the present invention is from 0.005 to 10 parts by weight, preferably, from 0.01 to 5 parts by weight and, more preferably, from 0.1 to 3 parts by weight based on 100 parts by weight of the thermoplastic polyester. If the addition amount is not greater than 0.005 parts by weight, the effect for improving the crystallization rate of the thermoplastic polyester is not sufficient, whereas if it exceeds 10 parts by weight, heat resistance, melt degradation stability, etc. become insufficient and, accordingly, both of the cases are not preferred.

Combined use of various organic acid salts or inorganic compounds which are known as the moldability improver for thermoplastic polyesters such as polyethylene terephthalate in addition to the composition according to the present invention is also preferred in view of the improvement in the moldability. As specific examples of these compounds, there can be mentioned, for example, stearates such as sodium stearate and barium stearate, sodium salts or barium salts of partially saponified montanic acid ester, ionomer, sodium salt of β-diketones, talc, etc.

Further, the moldability can be improved by adding a crystallization promotor used for thermoplastic polyesters such as polyethylene terephthalate to the composition according to the present invention. As specific examples of such crystallization promotor, there can be used preferably, for example, polyalkylene glycol such as polyethylene glycol and polypropylene glycol or carboxylic acid diesters thereof, polyalkylene glycol-α,ω-dialkylether such as polyethylene glycol-α,ω-dialkylether or polypropylene glycol-α,ω-dialkylether, benzoic acid ester compound such as neopentyl glycol dibenzoate, aliphatic polyesters such as polycaprolactone, polyethylene adipate and polybutylene adipate.

Further, by adding fiberous and/or granular fillers to the composition according to the present invention, the rigidity can remarkably be improved without reducing other physical properties, although it is not essential. As such fillers, there can be mentioned glass fibers, carbon fibers, metal fibers, alamide fibers, asbesto, potassium titanate whisker, wollastonite, glass flakes, glass beads, talc, mica, clay, calcium carbonate, barium sulfate, titanium oxide and aluminium oxide. Among them, chopped strand type glass fibers, talc and titanium oxide are used preferably, The amount of the fillers added is usually not greater than 120 parts by weight based on 100 parts by weight of the thermoplastic polyesters.

Furthermore, one or more of usual additives such as antioxidant, heat stabilizer, UV-absorber, antistatic agent, lubricant, mold releasing agent, colorant including dye and pigment, flame retardant, etc. to the composition according to the present invention within a range not impairing the object of the present invention.

Further, it is also possible to add a small amount of thermoplastic resin, for example, polycarbonate, polyamide, polyphenylene oxide, polyethylene, polypropylene, ethylene/propylene copolymer, ethylene/butene-1 copolymer, ethylene/propylene/non-conjugated diene copolymer, ethylene/ethyl acrylate copolymer, ethylene/glycidyl methacrylate copolymer, ethylene/vinyl acetate/glycidyl methacryalte copolymer, ethylene/propylene-g-maleic acid anhydride copolymer, etc.

Although there is no particular restriction for the method of producing the composition according to the present invention, there can be mentioned, preferably, a method of melt-mixing both of thermoplastic polyester and metal salt of substituted aromatic alcohols by using an extruder, a method of adding the metal salt of substituted aromatic alcohols during or at the final stage of the polymerization of the thermoplastic polyester, etc. In the case of adding inorganic filler or like other additive, it is preferred, that they are melt-blended together with both of the components as described above by using an extruder.

The resin composition according to the present invention can be molded easily by a usual method such as injection molding, extrusion molding, blow molding, vacuum forming, etc. and the resultant molding products show excellent properties.

The present invention is to be explained more specifically referring to examples, but the invention is not restricted to them. In these examples, the intrinsic viscosity shows a value as measured in an o-chlorophenol solution at 25° C.

EXAMPLES 1-19, COMPARATIVE EXAMPLES 1-8

Additives A-W shown below were blended at each of the ratios shown in Table 1 based on 100 parts by weight of polyethylene terephthalate (PET) with an intrinsic viscosity of 0.83 dl/g and melt-blended into pellets by a twin screw extruder of 30 mmφ set to 280° C.

The resultant polyethylene terephthalate composition was subjected to differential thermal analysis by using a differential scanning calorimeter manufactured by Parkin Elmer co., and crystallization temperature on heating and crystallization temperature on cooling were measured and crystallization rate was evaluated. As is well-known generally, since the crystallization rate is improved along with the increase of the crystallization temperature on cooling and along with the lowering of the crystallization temperature upon heating, ΔT defined as: ΔT=(crystallization temperature on cooling)−(crystallization temperature on heating) was used as a measure for the crystallization rate.

The intrinsic viscosity of the resultant pellets was measured to evaluate the reduction of the molecular weight upon production of the thermoplastic polyester resin composition.

To evaluate melt degradation stability, meltflow rate (MFR) after staying in a melt indexer (2 mmφ nozzle, 10 mm length, 5 kg load) at 280° C. for 6 min and 20 min was measured. If MFR rapidly increases due to staying, this corresponds to remarkable reduction of the molecular weight of the polyester, thus cirresponds to low melt degradation stability.

The results are shown in Table 1.

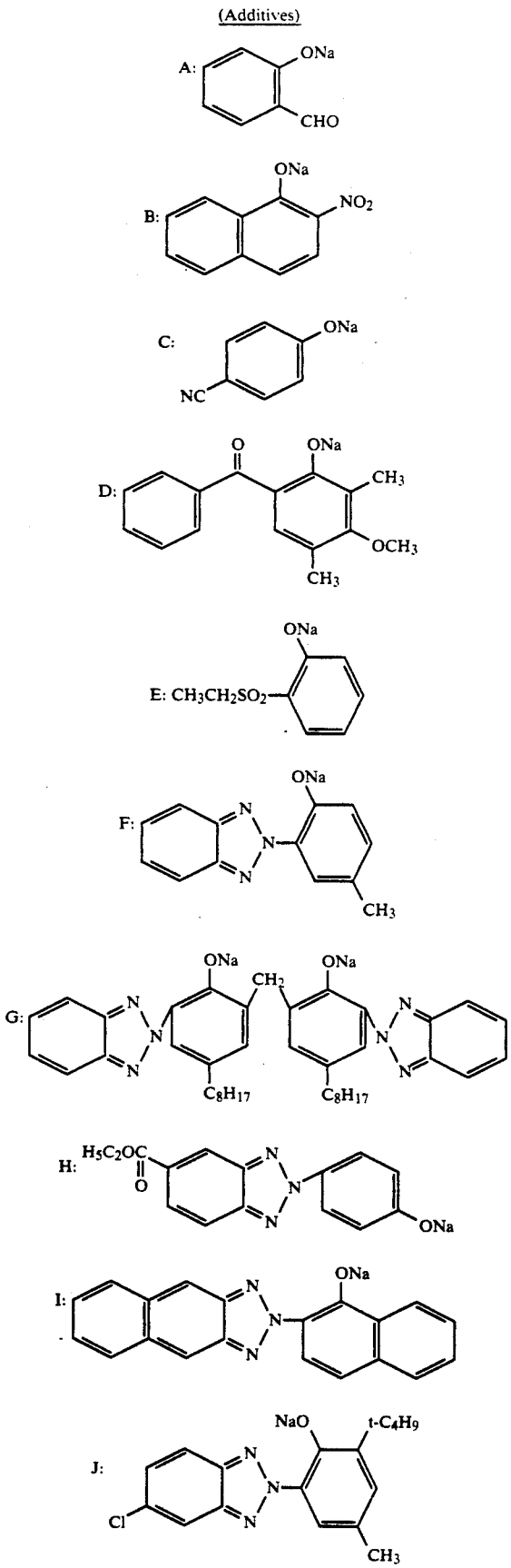

-continued
(Additives)

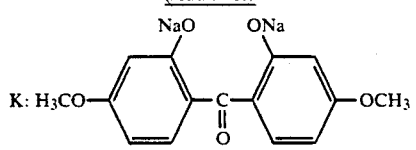

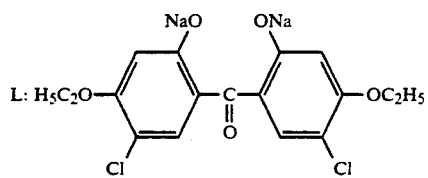

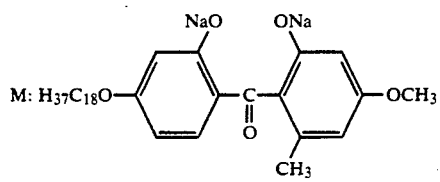

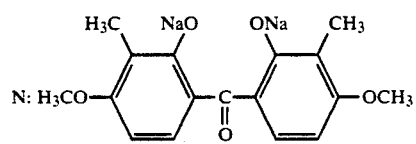

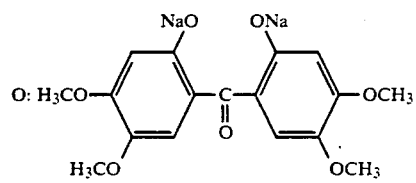

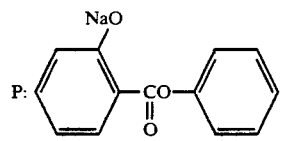

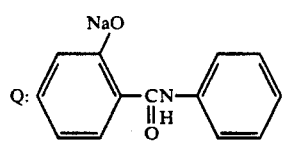

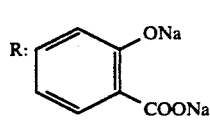

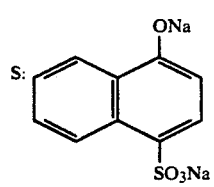

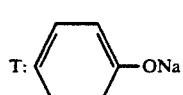

-continued
(Additives)

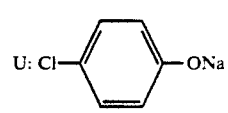

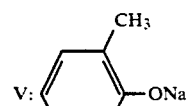

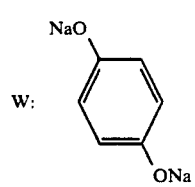

TABLE 1

| | Additive | | | Intrinsic | MFR (g/10 min) | |
| --- | --- | --- | --- | --- | --- | --- |
| | Type | Amount (parts) | ΔT (°C.) | viscosity (dl/g) | 6 min | 20 min |
| Example | | | | | | |
| 1 | A | 0.1 | 80 | 0.81 | 21 | 32 |
| 2 | A | 0.5 | 85 | 0.79 | 26 | 39 |
| 3 | A | 2.0 | 94 | 0.77 | 27 | 42 |
| 4 | B | 0.5 | 80 | 0.75 | 32 | 47 |
| 5 | C | 0.5 | 83 | 0.73 | 34 | 49 |
| 6 | D | 0.5 | 81 | 0.78 | 27 | 44 |
| 7 | E | 0.5 | 83 | 0.78 | 27 | 42 |
| 8 | F | 0.5 | 85 | 0.78 | 27 | 43 |
| 9 | G | 0.5 | 83 | 0.79 | 25 | 40 |
| 10 | H | 0.5 | 83 | 0.75 | 33 | 48 |
| 11 | I | 0.5 | 81 | 0.79 | 25 | 41 |
| 12 | J | 0.5 | 82 | 0.79 | 26 | 40 |
| 13 | K | 0.5 | 85 | 0.75 | 33 | 47 |
| 14 | L | 0.5 | 83 | 0.76 | 32 | 46 |
| 15 | M | 0.5 | 82 | 0.76 | 33 | 45 |
| 16 | N | 0.5 | 83 | 0.75 | 33 | 46 |
| 17 | O | 0.5 | 83 | 0.73 | 34 | 50 |
| 18 | P | 0.5 | 83 | 0.76 | 29 | 42 |
| 19 | Q | 0.5 | 85 | 0.78 | 27 | 40 |
| Comparative Example | | | | | | |
| 1 | — | — | 58 | 0.81 | 20 | 31 |
| 2 | A | 0.001 | 61 | 0.81 | 20 | 31 |
| 3 | R | 0.5 | 77 | 0.62 | 53 | 120 |
| 4 | S | 0.5 | 64 | 0.65 | 49 | 135 |
| 5 | T | 0.5 | 66 | 0.56 | 65 | >200 |
| 6 | U | 0.5 | 68 | 0.62 | 47 | 125 |
| 7 | V | 0.5 | 67 | 0.65 | 48 | 130 |
| 8 | W | 0.5 | 70 | 0.55 | 60 | 140 |

EXAMPLES 20-23, COMPARATIVE EXAMPLE 9

The additive (A) was blended at a ratio shown in Table 2 to 100 parts by weight of polycyclohexane dimethylene terephthalate (PCT) with intrinsic viscosity of 0.94 dl/g and melt-blended by a twin screw extruder of 30 mmφ set to 305° C., and cut into pellets.

The resultant pellets were evaluated in the same manner as those in example 1 except for setting the MFT measuring temperature to 305° C. Further, the same evaluation was also conducted for those without additive (A).

These results are shown in Table 2.

TABLE 1

| | Additive | | ΔT | Intrinsic viscosity | MFR (g/10 min) | |
|---|---|---|---|---|---|---|
| | Type | Amount (part) | (°C.) | (dl/g) | 6 min | 20 min |
| Example | | | | | | |
| 20 | A | 0.5 | 92 | 0.91 | 26 | 44 |
| 21 | F | 0.5 | 90 | 0.91 | 28 | 47 |
| 22 | K | 0.5 | 93 | 0.90 | 27 | 46 |
| 23 | Q | 0.5 | 94 | 0.90 | 28 | 48 |
| Comparative Example 9 | — | — | 65 | 0.93 | 25 | 43 |

EXAMPLES 24-40, COMPARATIVE EXAMPLES 10-16

30 parts of chopped strand type glss fiber (3 mm length, 11 μm diameter), and various kind of additives (A)-(W) were blended at each of the ratios in Table 3 to 100 parts by weight of polyethylene terephthalate with intrinsic viscosity of 0.60 dl/g, and melt-blended by using a twin screw extruder of 30 mmφ set to 280° C., and cut into pellets.

For the resultant polyethylene terephthalate compositions, differential thermal analysis was carried out in the same manner as in Example 1 to evaluate the crystallization rate.

The polyethylene terephthalate resin composition obtained by melt-blending was dissolved in o-chlorophenol and, after separating glass fibers by using a centrifugator, the solution was poured into methanol to obtain a polymer not containing glass fibers. The intrinsic viscosity of the resultant polymer was measured, and the molecular weight reduction upon producing the resin composition under the presence of glass fibers was evaluated.

After drying the pellets at 155° C. for 5 hours in vacuum, boxlike molding products each of 40 mm length, 60 mm width, 20 mm depth and 2 mm wall thicness were molded by using screw inline type injection molder set to 280° C., at a mold clamping pressure of 75 tons and under the conditions of injection period/cooling period/intermediate period: 15 sec/20 sec/5 sec, and mold temperature of 85° C., and a force required for releasing the molded product from the mold (mold releasing force) was determined.

Under the same injection molding conditions as described above, ASTM-No. 1 dumbbell was molded and tensile property was measured in accordance with ASTM D-638.

The tensile strength of the dumbbell, after immersed in water at 85° C. for 500 hours, was measured and the retention ratio, which is defined as the ratio of the tensile strength after the treatment to the original value, was determined.

These results are shown in Table 3.

TABLE 3

| | Additive | | ΔT (°C.) | Intrinsic viscosity (dl/g) | Mold releasing force (kgf) | Tensile Strength (kgf/cm) | Elongation at break (%) | After immersing in water at 85° C., 500 hr. | | |
|---|---|---|---|---|---|---|---|---|---|---|
| Example | Kind | Amount (parts) | | | | | | Tensile strength (kgf/cm) | Elongation at break (%) | Tensile strength retention ratio (%) |
| Example | | | | | | | | | | |
| 24 | A | 0.5 | 96 | 0.55 | 47 | 1550 | 3.0 | 1270 | 2.5 | 82 |
| 25 | B | 0.5 | 96 | 0.56 | 44 | 1560 | 3.1 | 1310 | 2.6 | 84 |
| 26 | C | 0.5 | 93 | 0.55 | 49 | 1520 | 3.2 | 1260 | 2.7 | 83 |
| 27 | D | 0.5 | 94 | 0.56 | 50 | 1520 | 3.1 | 1290 | 2.6 | 85 |
| 28 | E | 0.5 | 96 | 0.57 | 43 | 1530 | 3.0 | 1290 | 2.5 | 84 |
| 29 | F | 0.5 | 97 | 0.57 | 44 | 1560 | 3.0 | 1330 | 2.6 | 85 |
| 30 | G | 0.5 | 95 | 0.58 | 46 | 1540 | 3.1 | 1290 | 2.5 | 84 |
| 31 | H | 0.5 | 94 | 0.55 | 48 | 1510 | 3.0 | 1300 | 2.3 | 86 |
| 32 | I | 0.5 | 94 | 0.56 | 50 | 1520 | 3.1 | 1310 | 2.5 | 87 |
| 33 | J | 0.5 | 95 | 0.57 | 48 | 1530 | 3.1 | 1320 | 2.4 | 86 |
| 34 | K | 0.5 | 97 | 0.55 | 43 | 1530 | 3.0 | 1300 | 2.6 | 85 |
| 35 | L | 0.5 | 94 | 0.56 | 45 | 1520 | 3.1 | 1280 | 2.6 | 84 |
| 36 | M | 0.5 | 93 | 0.54 | 43 | 1530 | 3.1 | 1220 | 2.5 | 80 |
| 37 | N | 0.5 | 94 | 0.53 | 41 | 1530 | 3.0 | 1270 | 2.5 | 83 |
| 38 | O | 0.5 | 95 | 0.52 | 45 | 1510 | 3.0 | 1240 | 2.5 | 82 |
| 39 | P | 0.5 | 95 | 0.57 | 45 | 1520 | 3.0 | 1290 | 2.5 | 85 |
| 40 | Q | 0.5 | 97 | 0.55 | 41 | 1530 | 3.1 | 1330 | 2.6 | 87 |
| Comparative Example | | | | | | | | | | |
| 10 | — | — | 62 | 0.58 | >200 | 1260 | 3.0 | 600 | 1.7 | 48 |
| 11 | R | 0.5 | 79 | 0.43 | 140 | 1390 | 1.8 | 580 | 1.4 | 42 |
| 12 | S | 0.5 | 68 | 0.48 | 180 | 1350 | 2.1 | 540 | 1.4 | 40 |
| 13 | T | 0.5 | 70 | 0.42 | 140 | 1300 | 1.7 | 494 | 1.2 | 38 |
| 14 | U | 0.5 | 72 | 0.44 | 140 | 1300 | 1.7 | 500 | 1.2 | 38 |
| 15 | V | 0.5 | 71 | 0.48 | 130 | 1310 | 1.7 | 540 | 1.4 | 41 |
| 16 | W | 0.5 | 74 | 0.41 | 140 | 1380 | 1.8 | 550 | 1.5 | 40 |

EXAMPLES 41-46

Various additives shown in Table 4, together with 0.5 parts of the above-mentioned additive A, were blended each at a ratio shown in Table 4 to 100 parts by weight of polyethylene terephthalate with an intrinsic viscosity of 0.83 dl/g and melt-blended by a twin screw extruder with 30 mmφ, set to 28° C., and water cooled, then pelletized.

Differential thermal analysis was cinducted in the same manner to the resultant polyethylene terephthalate compositions to evaluate the crystallization rate. Further, the intrinsic viscosity of the pellets was measured, which was used as a measure for the molecular weight reduction upon producing the thermoplastic polyestrer resin compositiopn.

The results are shown in Table 4.

TABLE 4

| Example | Additive Kind | Amount added | ΔT (°C.) | Intrinsic viscosity (dl/g) |
|---|---|---|---|---|
| 41 | polyethylene glycol-α,ω-dimethyl ether (molecular weight: 1000) | 3 parts | 98 | 0.70 |
| 42 | propylene glycol-α,ω-dimethyl ether (molecular weight: 1000) | 3 parts | 99 | 0.71 |
| 43 | polybutylene adipate (molecular weight: 2000) | 3 parts | 95 | 0.68 |
| 44 | polycaprolactone (molecular weight: 2000) | 3 parts | 94 | 0.67 |
| 45 | Talc | 0.5 parts | 89 | 0.78 |
| 46 | Ph−C(O)−CH(Na)−C(O)−Ph | 0.5 parts | 90 | 0.75 |

What is claimed is:

1. A polyester composition comprising 100 parts by weight of a thermoplastic polyester which essentially comprises an acid having a cyclic group selected from the group consisting of aromatic and heterocyclic dicarboxylic acids, said acid having 8 to 20 carbon atoms, and at least one diol selected from the group consisting of the aliphatic diols and cycloaliphatic diols having 2 to 10 carbon atoms, and 0.005 to 10 parts by weight of a metal alcoholate salt of a substituted aromatic alcohol having at least one aromatic ring, at least one hydroxyl group directly bonded to said aromatic ring and at least one non-ionic group directly bonded to said aromatic ring, the said non-ionic group being at least one group selected from the group consisting of cyano group, nitro group, formyl group, acyl group, alkoxycarbonyl group, carboamide group and triazole group, in which said hydroxyl group is in the form of a metal salt, and wherein the said metal of said hydroxyl group metal salt is at least one metal selected from the group consisting of alkali metal, alkaline earth metal, aluminum and zinc.

2. A composition as defined in claim 1, wherein the thermoplastic polyester is selected from the group consisting of polyethylene terephthalate, polybutylene terephthalate, polyethylene-2,6-naphthalate and poly-1,4-cyclohexane dimethylene terephthalate.

3. A composition as defined in claim 1, wherein the intrinsic viscosity of the thermoplastic polyester is within a range from 0.25 to 3.0 dl/g.

4. A composition as defined in claim 1, wherein the aromatic ring to which the hydroxyl group in the metal salt is bonded is selected from the group consisting of benzene, naphthalene, phenanthrene, anthracene, pyrene, pyridine, triazine, furan, quinoline and isoquinoline.

5. A composition as defined in claim 1, wherein the metal that forms the salt in the metal salt is at least one metal salt selected from the group consisting of lithium, sodium, potassium, calcium and barium.

6. A composition as defined in claim 1, wherein the hydroxyl group in the metal salt and the non-ionic group bonded to the aromatic ring are directly bonded to an identical ring.

7. A composition as defined in claim 1, wherein the aromatic alcohol, from which the metal alcoholate salt is made, is a compound selected from the group consisting of a formyl-phenol, nitrophenol, carboethoxyphenol, carbopropoxyphenol, carbobutoxyphenol, N-phenyl carboamide phenol, hydroxybenzophenone, dihydroxybenzophenone and (hydroxyphenyl) benzotriazole group.

8. A composition as defined in claim 1, wherein the added amount of the metal salt of the substituted aromatic alcohol is from 0.01 to 5 parts by weight based on 100 parts by weight of the thermoplastic polyester.

* * * * *

UNITED STATES PATENT AND TRADEMARK OFFICE
CERTIFICATE OF CORRECTION

PATENT NO. : 5,110,849
DATED : May 5, 1992
INVENTOR(S) : Hiroo Karasawa, et. al.

It is certified that error appears in the above-indentified patent and that said Letters Patent is hereby corrected as shown below:

In Column 5, at line 25, please change "N" to --C--, second occurrence, and at line 28, please change "N" to --C--, second occurrence.

Signed and Sealed this

Ninth Day of November, 1993

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,110,849
DATED : May 5, 1992
INVENTOR(S) : Karasawa et al

It is certified that error appears in the above-indentified patent and that said Letters Patent is hereby corrected as shown below:

```
             On the title page, after [22] but before  [51], please
insert the following:
--[30] Foreign Application Priority Data
      Jul. 18, 1988. [JP]........63-178,324--
and after [22] but before [51], please insert
--          Related U.S. Application Data
   [63] Continuation-in-part of Ser. No. 378,710,
        Jul. 12, 1989, abandoned--.

In Column 5, at line 25, please change "N" to --C--, second
occurrence, and at line 28, please change "N" to --C--, second
occurrence.
```

Signed and Sealed this

Fourteenth Day of December, 1993

Attest:

BRUCE LEHMAN

*Attesting Officer*     *Commissioner of Patents and Trademarks*